United States Patent
Kondrad et al.

(10) Patent No.: US 10,518,735 B2
(45) Date of Patent: Dec. 31, 2019

(54) SEAT COVER ASSEMBLY

(71) Applicant: Ford Global Technologies, LLC, Dearborn, MI (US)

(72) Inventors: Marcos Silva Kondrad, Macomb Township, MI (US); Ryan Welch, Ottawa Lake, MI (US); Kevin Mozurkewich, Livonia, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 15/878,967

(22) Filed: Jan. 24, 2018

(65) Prior Publication Data

US 2019/0225180 A1    Jul. 25, 2019

(51) Int. Cl.
*B60R 21/2165* (2011.01)
*B60N 2/60* (2006.01)
*B60R 21/207* (2006.01)
*B60N 2/68* (2006.01)
*B60N 2/58* (2006.01)

(52) U.S. Cl.
CPC ........ *B60R 21/2165* (2013.01); *B60N 2/6018* (2013.01); *B60N 2/686* (2013.01); *B60R 21/207* (2013.01); *B60N 2002/5808* (2013.01)

(58) Field of Classification Search
CPC ... B60R 21/2165; B60R 21/207; B60N 2/686; B60N 2/6018; B60N 2002/5808
See application file for complete search history.

(56) References Cited

U.S. PATENT DOCUMENTS

| | | | |
|---|---|---|---|
| 6,079,779 A | 6/2000 | Tanaka et al. | |
| 6,332,651 B1 | 12/2001 | Horisawa | |
| 7,311,325 B2 * | 12/2007 | Tracht | B60R 21/207 |
| | | | 280/730.2 |
| 7,673,939 B2 | 3/2010 | Taguchi et al. | |
| 7,699,396 B2 | 4/2010 | Ghisoni et al. | |
| 8,025,333 B2 | 9/2011 | Yasuda | |
| 8,465,093 B2 | 6/2013 | Janowski | |
| 9,821,695 B2 * | 11/2017 | Tarumi | B60N 2/5841 |
| 2009/0160230 A1 * | 6/2009 | Yasuda | B60N 2/5816 |
| | | | 297/228.13 |
| 2010/0025970 A1 * | 2/2010 | Paruszkiewicz | B60N 2/58 |
| | | | 280/728.3 |

(Continued)

*Primary Examiner* — Drew J Brown
(74) *Attorney, Agent, or Firm* — Vichit Chea; Price Heneveld LLP

(57) ABSTRACT

A trim cover for a seat assembly includes a front trim cover having first and second sides with first zipper portions disposed on the first and second sides. First and second intermediate strips include first and second ends. The first ends of the intermediate strips include second zipper portions that releasably couple to the first zipper portions of the front trim cover. A rigid back panel includes first and second sides that are operably coupled to the second ends of the first and second intermediate strips. The back panel is coupled to the front trim cover through the intermediate strips. The back panel is a rigid self-supporting member that is pierceable along an edge portion thereof, such that the second ends of the intermediate strips are stitched to the back panel in assembly.

15 Claims, 4 Drawing Sheets

(56) References Cited

U.S. PATENT DOCUMENTS

| | | | | |
|---|---|---|---|---|
| 2011/0043013 A1* | 2/2011 | Sugiura | ................ | B60N 2/6009 |
| | | | | 297/228.11 |
| 2016/0059756 A1* | 3/2016 | Matsuhashi | .............. | B60N 2/60 |
| | | | | 297/228.12 |
| 2017/0253157 A1* | 9/2017 | Nagasawa | ................ | B60N 2/60 |
| 2017/0303700 A1* | 10/2017 | Nishino, Jr. | ............ | A47C 31/11 |
| 2018/0118066 A1* | 5/2018 | Fujikake | ................ | A47C 31/11 |
| 2018/0319301 A1* | 11/2018 | Haby | ........................ | B60N 2/99 |
| 2019/0039486 A1* | 2/2019 | Wright | ................ | B60N 2/5685 |

\* cited by examiner

SEAT COVER ASSEMBLY

FIELD OF THE INVENTION

The present invention generally relates to a seat cover assembly for a vehicle seat, and more particularly, to a seat cover assembly having a rigid back panel that is releasably coupled to a front trim cover using intermediate members stitched to the rigid back panel.

BACKGROUND OF THE INVENTION

As the automotive industry continues to push to reduce weight in vehicles, it is important to consider all aspects of the vehicle. Currently, most OEM's, use an enveloped seat cover execution. This means that an assembled one-piece trim cover is slipped down over top of the cushion materials and frame assembly once the cushion materials and frame assembly have been assembled. An easily installed and stylized trim cover is desired.

SUMMARY OF THE INVENTION

According to one aspect of the present invention, a trim cover for a seat assembly includes a front trim cover having first and second sides with first zipper portions disposed thereon. First and second intermediate strips include first and second ends. The first ends of the intermediate strips include second zipper portions that releasably couple to the first zipper portions of the front trim cover. A rigid back panel includes first and second sides that are operably coupled to the second ends of the first and second intermediate strips.

Embodiments of the first aspect of the invention can include any one or a combination of the following features:
  wherein the rigid back panel is a compression molded part, and further wherein the first and second sides of the rigid back panel are pierceable first and second sides;
  wherein the pierceable first and second sides of the rigid back panel are stitched to the second ends of the first and second intermediate strips;
  wherein the front trim cover is a soft front trim cover;
  wherein the front trim cover includes a tear seam disposed thereon;
  wherein the front trim cover includes a rear edge having first and second sides, wherein the first zipper portion of the first side of the front trim cover is disposed on an inner surface of the front trim cover inset from the first side of the rear edge;
  wherein the first zipper portion of the second side of the front trim cover is disposed on the inner surface of the front trim cover inset from the second side of the rear edge; and
  wherein the first and second edges of the front trim cover conceal respective zipper assemblies defined when the first zipper portions of the front trim cover are coupled to the second zipper portions of the first and second intermediate strips.

According to another aspect of the present invention, a trim cover for a seat assembly includes a rigid back panel having first and second sides. An intermediate strip includes first and second ends. The first end of the intermediate strip includes a zipper portion, and a second end of the intermediate strip is operably coupled to the second side of the rigid back panel. A front trim cover includes a zipper portion releasably coupled to the zipper portion that is of the intermediate strip.

Embodiments of the second aspect of the invention can include any one or a combination of the following features:
  wherein the rigid back panel is a compression molded unitary back panel;
  wherein the second side of the rigid back panel is stitched to the second end of the intermediate strip;
  wherein the front trim cover is a soft front trim cover having a tear seam disposed thereon;
  wherein the compression molded back panel includes an inset central portion; and
  a zipper assembly defined by the zipper portion of the intermediate strip and the zipper portion of the front trim cover, and wherein the zipper assembly is concealed by a portion of the front trim cover when the zipper portion of the intermediate strip is coupled to the zipper portion of the front trim cover.

According to another aspect of the present invention, a seat assembly includes a seatback frame assembly having first and second side members. A cushion assembly is operably coupled to the seatback frame assembly. A front trim cover at least partially covers the cushion assembly and the frame assembly and includes a zipper portion disposed on a first side thereof. An intermediate strip includes first and second ends. The first end of the intermediate strip includes a zipper portion that is releasably coupled to the zipper portion of the front trim cover. A self-supporting back panel includes an edge portion, wherein the edge portion is operably coupled to the second end of the intermediate strip.

Embodiments of the third aspect of the invention can include any one or a combination of the following features:
  wherein an airbag coupled to the frame assembly;
  wherein the front trim cover is a soft front trim cover having a tear seam disposed thereon, and further wherein the tear seam is disposed over the airbag in assembly;
  wherein the self-supporting back panel is a compression molded back panel, and further wherein the edge portion is a pierceable edge portion;
  wherein the pierceable edge portion of the self-supporting back panel is stitched to the second end of the intermediate strip; and
  wherein the compression molded back panel includes an inset central portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
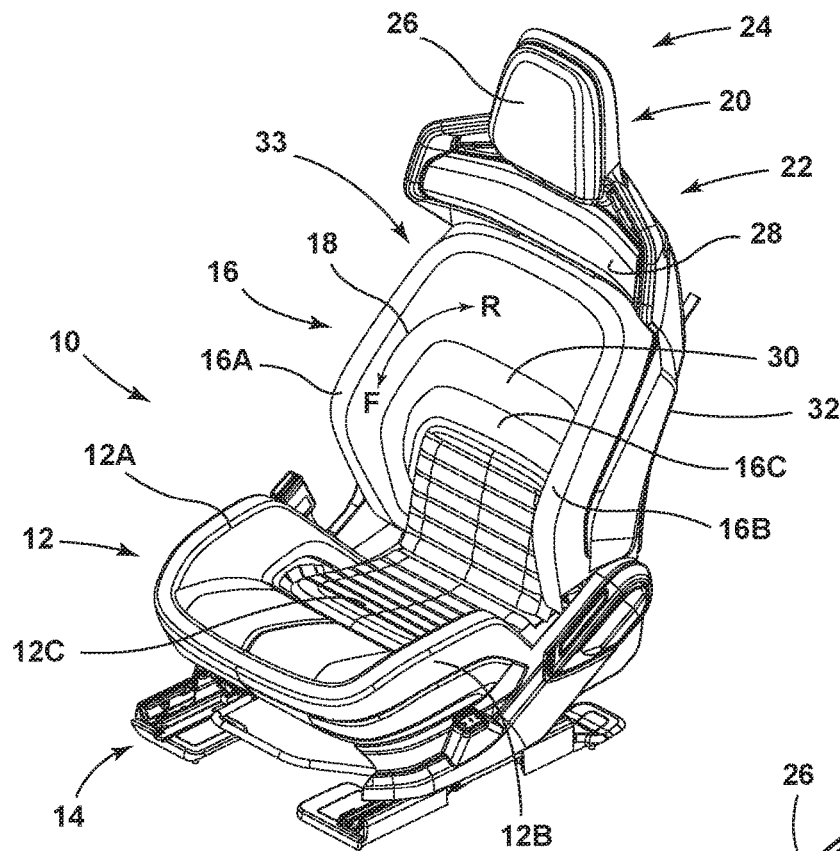
FIG. 1 is a front perspective view of a seat assembly according to one embodiment of the present invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally indicates a seat assembly for use in a vehicle. The seat assembly 10 shown in FIG. 1 is a highly contoured and stylized seat assembly that is configured for use in a high performance vehicle. The seat assembly 10 generally includes a seat portion 12 which is supported on a track system 14 for linear movement between fore and aft positions. The seat assembly 10 further includes a seatback 16 which is contemplated to be pivotally coupled to the seat portion 12. The seatback 16 is contemplated to move between various positions along the path as indicated by arrow 18 between a full forward position F and a reclined position R. In FIG. 1, the seatback 16 is generally shown in an upright use position for properly supporting a vehicle occupant. The seat assembly 10 further includes a headrest assembly 20 having a base portion 22 and a support portion 24 which includes a cushioned headrest bun 26. The base portion 22 of the headrest assembly 20 further includes a thoracic support cushion 28 disposed on a front portion thereof. The headrest assembly 20 is designed to provide a robust support system for the head of a vehicle occupant as desired for use in a high performance vehicle where a vehicle occupant is subject to more intense forces as compared to a regular automotive vehicle given the speed, performance, and handling associated with a high performance vehicle.

To provide the enhanced support features desired in a high performance vehicle, the seat assembly 10 includes the robust headrest assembly 20 having a forwardly curved base portion 22 that has a width commensurate with a width of the seatback 16. The seatback 16 includes first and second side bolsters 16A, 16B disposed on opposite sides of an inset central portion 16C. The seat portion 12 similarly includes first and second side bolsters 12A, 12B which outwardly extend from a generally inset central portion 12C. With the first and second side bolsters 16A, 16B of the seatback 16 and the first and second side bolsters 12A, 12B of the seat portion 12, the central portions 12C, 16C of the seat portion 12 and seatback 16 generally define a bucket seat configuration for the seat assembly 10. The first and second side bolsters 12A, 12B, 16A, 16B are generally configured to properly position and support, retain a vehicle occupant while driving a high performance vehicle.

Figure 2:
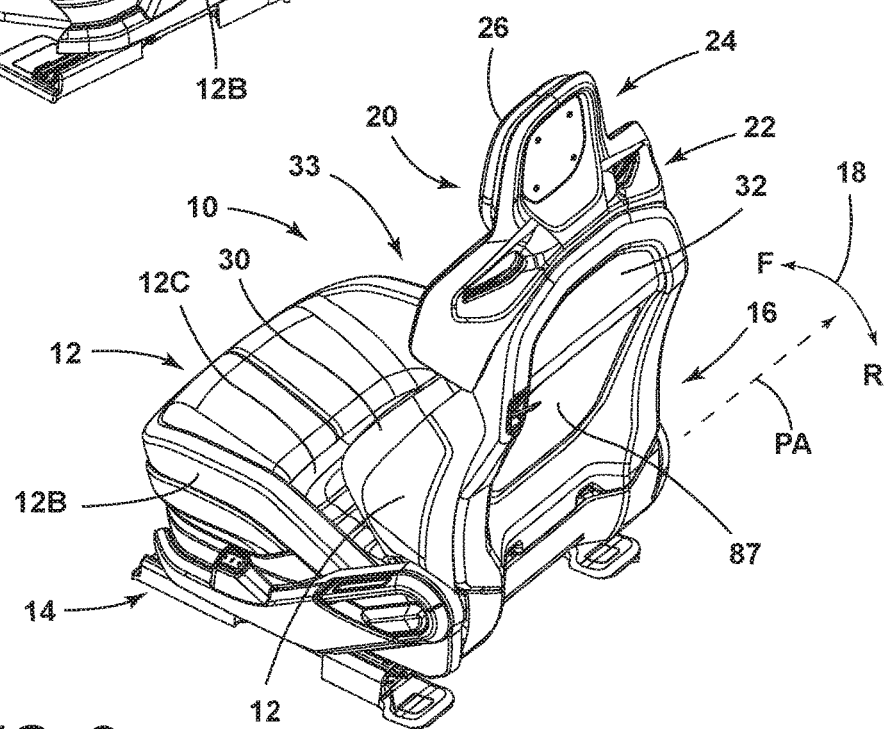
FIG. 2 is a rear perspective view of the seat assembly of FIG. 1.

Referring now to FIG. 2, the seat assembly 10 is shown from a rear perspective view, wherein a pivot access PA is indicated for movement of the seatback 16 relative to the seat portion 12. As noted above, the seatback 16 is configured for movement between forward and rear positions F, R along the path as indicated by arrow 18. In FIG. 2, the seatback 16 is shown in an upright use position for supporting a vehicle occupant.

With further reference to FIGS. 1 and 2, the seat assembly 10 includes a front trim cover 30 that is coupled to a back panel 32 to substantially cover the seatback 16 of the seat assembly 10. The front trim cover 30 is contemplated to be a soft trim cover that covers and follows the contours of the front portion of the seat assembly 10. The back panel 32 is contemplated to be a substantially rigid and self-supporting member that covers the rear side of a frame assembly 70 (FIGS. 3A, 3B) of the seat assembly 10 and has a number of integrated contoured features further described below. Together, the front trim cover 30 and back panel 32 define a seat trim cover assembly 33 covering various support and frame assemblies of the seat assembly 10. The front trim cover 30 is contemplated to be comprised of a suitable natural or synthetic material, or any combination thereof, that is a conformable soft material to generally cover the various contours of a cushion assembly 60 (FIGS. 3A, 3B) of the seat assembly 10. The back panel 32 is a rigid self-supporting member that is molded to include a number of contours which require a substantially rigid structure to maintain. It is contemplated that the back panel 32 is comprised of a compression molded material. In making the back panel 32, a lofted material, such as glass fibers covered in a thermoplastic polymer (e.g. polypropylene), is cut to form and covered with an elastic cover stock to form a blank. The blank is then compression molded in a press, whereby the cover stock adheres to the glass fibers. The compression molding process involves one or more molds having a reverse image of a desired configuration contacting the blank and compressing and heating the lofted material of the blank until the back panel 32 is formed and cured. The lofted material may be compressed from about 40 mm thick to about 2 mm thick to adhere the flexible cover stock to the glass fiber material. The compression of the lofted material increases the density of the material to provide a rigid self-supporting member. As used herein, the terms "rigid" and "self-supporting" are used to define a back panel 32 that is hard and dense, but less dense than an injection molded polymeric part commonly found on vehicle seat assemblies. Thus, the back panel 32 of the present concept includes the necessary structural rigidity to maintain a configuration imparted on the back panel in the compression molding process, that a cloth, leather or vinyl back panel could not maintain. In the compression molding process, the contours of the one or more molds are compressed into the back panel 32 to provide a highly contoured and stylized panel. As shown in FIGS. 2 and 3B, the back panel 32 of the present concept includes an inset middle portion 87 that is formed during the compression molding process and maintained by the self-supporting characteristics of the back panel 32 in assembly.

Figure 3A:
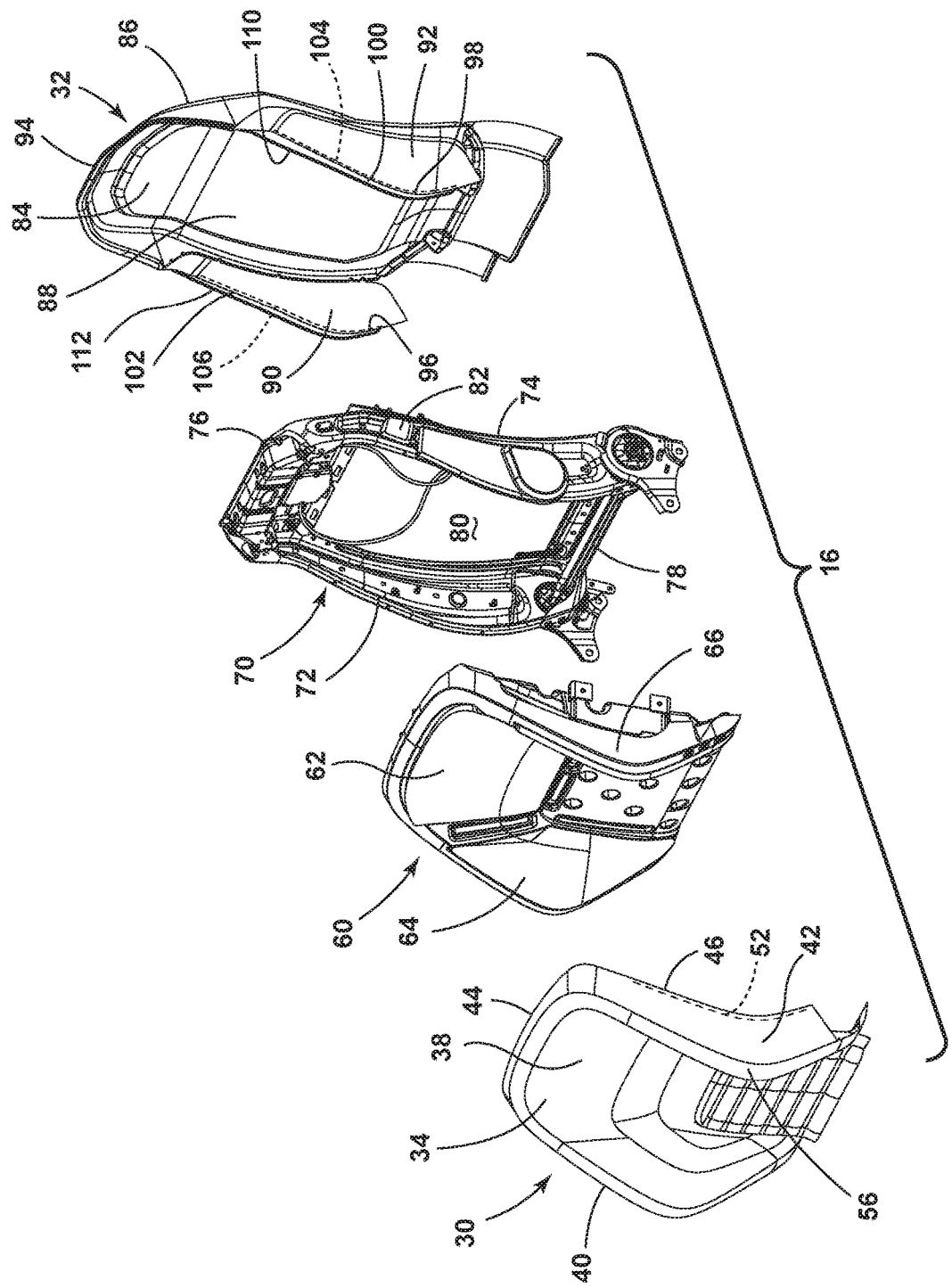
FIG. 3A is an exploded front perspective view of a seatback of the seat assembly of FIG. 1.
Figure 3B:
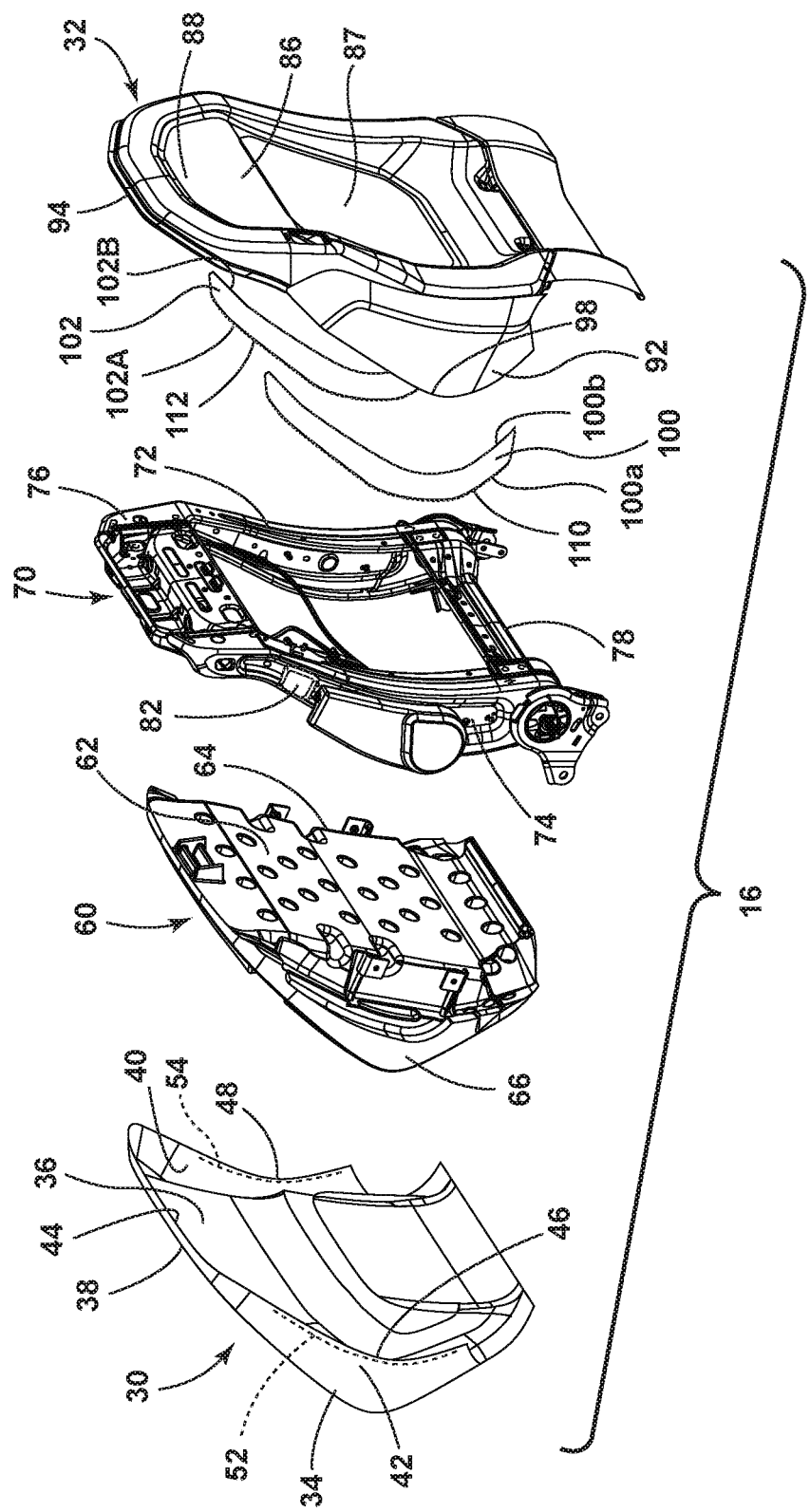
FIG. 3B is an exploded rear perspective view of the seatback of FIG. 3A.

Referring now to FIGS. 3A and 3B, the front trim cover 30 includes an outer surface 34 and an inner surface 36. The front trim cover 30 further includes a central portion 38 having first and second side portions 40, 42 disposed on opposite sides thereof. The front trim cover 30 further includes a rear edge 44 having first and second sides 46, 48. Inset from the first and second sides 46, 48 of the rear edge 44, zipper portions 52, 54 are coupled to the inner surface 36 of the front trim cover 30. The zipper portions 52, 54 may be referred to herein as first zipper portions that are reciprocal parts to second zipper portions 110, 112 disposed on the back panel 32 for releasably coupling thereto, as further described below. The front trim cover 30 further includes a tear seem 56 positioned on the second side portion 42 thereof. Thus, it is contemplated that the seatback 16 of FIG. 3A may be a driver's side seatback, for which a side airbag (SAB) deployment mechanism may be included and concealed by the second side portion 42 of the front trim cover 30. With the tear seam 56 disposed on the second side portion 42 of the front trim cover 30, an airbag assembly 82 can deploy through the tear seem 56. The tear seem 56 may be provided on the first side portion 40 of the front trim cover 30 when the seatback 16 is configured for use on a passenger side seat assembly.

With further reference to FIGS. 3A and 3B, a cushion assembly 60 is shown having a central portion 62 and first and second side portions 64, 66 in assembly, the front trim cover 30 covers the cushion assembly 60 such that the central portion 38 of the front trim cover 30 covers the central portion 62 of the cushion assembly 60, while the first and second side portions 40, 42 of the front trim cover 30 cover the first and second side portions 64, 66 of the cushion assembly 60. The cushion assembly 60 is supported on a frame assembly 70 which includes first and second side members 72, 74, as well as upper and lower cross members 76, 78. Together the first and second side members 72, 74 and upper and lower cross members 76, 78 surround a centrally disposed window 80 of the frame assembly 70. As further shown in FIGS. 3A and 3B, side member 74 includes an airbag assembly 82 disposed thereon for deployment therefrom.

As noted above, the front trim cover 30 is a soft and conformable material that can easily be configured to closely follow the contours of the cushion assembly 60 which the front trim cover 30 covers in assembly. Thus, unlike the back panel 32, the front trim cover 30 is flexibly and conformable and is not a rigid self-supporting part. The front trim cover 30 can be stitched, hooked, adhered or otherwise coupled to the frame assembly 70 or the cushion assembly 60 for precise following of the contours of these substructures of the seat assembly 10.

With further reference to FIGS. 3A and 3B, the back panel 32 includes an inner surface 84 and an outer surface 86, wherein the outer surface is generally comprised of a cover stock material, such as a cloth material. The back panel 32 further includes a central portion 88 having first and second side portions 90, 92 disposed on opposite sides thereof. The back panel 32 further includes a front edge 94 having first and second sides 96, 98. Along the front edge 94, at the first and second sides 96, 98 thereof, intermediate strips 100, 102 are stitched to the back panel 32. Specifically, the intermediate strips 100, 102 are shown coupled to the back panel 32 at respective stitched lines 104, 106 in FIG. 3A. The intermediate strips 100, 102 include first and second ends 100A, 100B and 102A, 102B respectively. At stitched lines 104, 106, the second ends 100B, 102B are stitched to the first and second sides 96, 98 of the front edge 94 of the back panel 32. A zipper portion 110 is shown disposed on the front end 100A of intermediate strip 100. Further, a zipper portion 112 is shown disposed on the front end 102A of intermediate strip 102. In assembly, the respective zipper portions 110, 112 of the intermediate strips 100, 102 are zipped to the zipper portions 52, 54 (best shown in FIG. 3B) disposed on the inner surface 36 of the front trim cover 30. With the intermediate strips 100, 102 stitched to the first and second sides 96, 98 of the front edge 94 of the back panel 32, the coupling of the zipper portions 110, 112 of the intermediate strips 100, 102 to the zipper portions 52, 54 of the front trim cover 30, operably couples the front trim cover 30 to the back panel 32 around the frame assembly 70 and the cushion assembly 60, as shown in FIGS. 1 and 2.

Thus, the back panel 32, while rigid and self-supporting, is comprised of pierceable portions of thinned (or highly compressed) material, such as the first and second sides 96, 98 of the front edge 94. In this way, the back panel 32 of the present concept can be stitched to the intermediate strips 100, 102 for a seamless and aesthetically pleasing transition. Unlike injection molded polymeric back panels that are hard cured panels that are impenetrable for stitching purposes, the compressed glass fiber material of the back panel 32 and cover stock is pierceable, such that the back panel 32 can be fixedly coupled to the intermediate strips 100, 102 by stitching adjacent ends thereof together. Like injection molded parts, the back panel 32 of the present concept can also be coupled directly to the frame assembly 70. However, unlike injection molded polymeric back panels, the front edge 94 of the back panel 32 of the present concept will be mechanically fixed to the intermediate strips 100, 102. In this way, when a user grasps the sides of the seatback 16, the back panel 32 and intermediate strips 100, 102 will not separate (due to the stitching therebetween) and create pinch points like hard plastic back panels will do at edge portions thereof when overlapping soft front trim covers in a standard seat cover assembly. The intermediate strips 100, 102 can be any suitable material, such as cloth, vinyl, leather, or the like, that can be used to secure the back panel 32 to the front trim cover 30 in assembly. It is contemplated that the intermediate strips 100, 102 are soft, flexible materials for defining living hinges between the back panel 32 and the front trim cover 30. In this way, the intermediate strips 100, 102 assist in the installation of the overall seat cover assembly onto the cushion assembly 60 and frame assembly 70 of the seatback 16.

Figure 4:
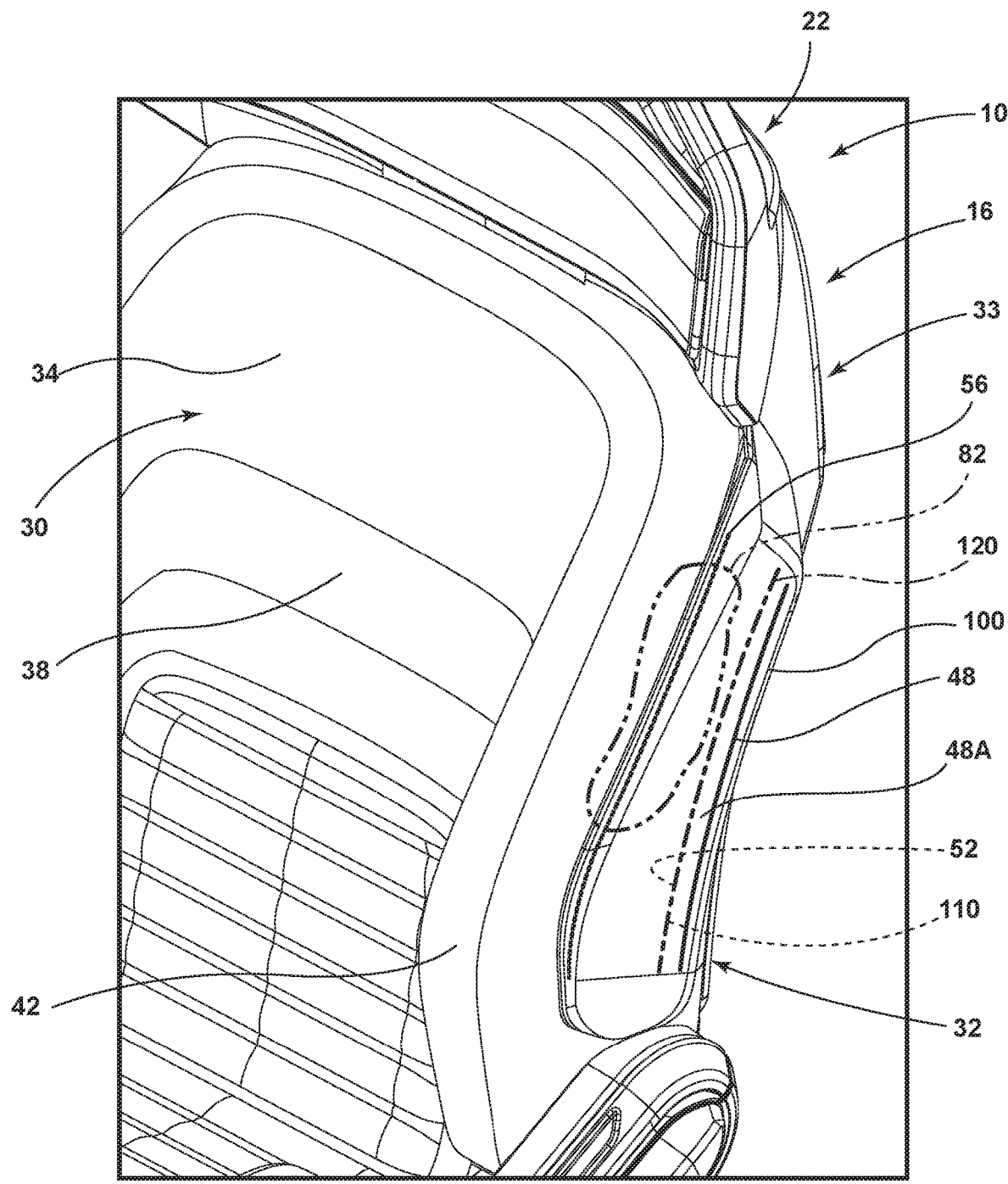
FIG. 4 is a fragmentary front perspective view of the seatback of FIG. 1.

Referring now to FIG. 4, the back panel 32 is shown coupled to the intermediate strip 100 which is further zippered to the front trim cover 30 at zipper assembly 120. The zipper assembly 120 is comprised of first zipper portion 52 of the front trim cover 30 and second zipper portion 110 of intermediate strip 100. In this way, the front trim cover 30 is releasably coupled to the intermediate strip 100 which is stitched to the back panel 32 at stitching line 104, as best shown in FIG. 3A. The first side portion 46 of the rear edge 44 of the front trim cover 30 is shown extending beyond the zipper assembly 120, such that the zipper assembly 120 is concealed by a forward flap 48A of the front trim cover 30. As further shown in FIG. 4, the airbag assembly 82 is shown positioned adjacent to the tear seam 56 of the front trim cover 30. Thus, the living hinge capabilities of intermediate strips 100, 102 and the zippered portions 52, 54 and 110, 112 of the front trim cover 30 and intermediate strips 100, 102 provide for easy alignment of the tear seam 56 with the airbag assembly 82 as the cover assembly 33 is placed on the seatback 16. This is due in part to the releasable zipper features of the seat cover assembly 33 of the present concept that allow the front trim cover 30 and the back panel 32 to surround and encase the cushion assembly 60 and the frame assembly 70 before coupling to one another. Without having to manually slip a fully connected seat cover assembly over the cushion assembly 60 and the frame assembly 70, as done in standard seat cover assembly installs, the tear seam 56 of the front trim cover 30 can be properly aligned over the airbag assembly 82 positioned on the frame assembly 70 before the front trim cover 30 is zipped to the intermediate strips 100, 102. In this way, the execution of the installation of the cover assembly 33 of the present concept is more consistent and accurate by reducing the chances of installer alignment error which, is more common in an installation of a form-fitting seat cover assembly without any releasable features.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trim cover for a seat assembly, comprising:
   a front trim cover having first and second sides with first zipper portions disposed thereon;
   first and second intermediate strips having first and second ends, the first ends including second zipper portions releasably coupled to the first zipper portions of the front trim cover; and
   a rigid back panel having first and second sides operably coupled to the second ends of the first and second intermediate strips, wherein the rigid back panel is a compression molded part, and further wherein the first and second sides of the rigid back panel are pierceable first and second sides stitched to the second ends of the first and second intermediate strips.

2. The trim cover of claim 1, wherein the front trim cover is a soft front trim cover.

3. The trim cover of claim 1, wherein the front trim cover includes a tear seam disposed thereon.

4. The trim cover of claim 1, wherein the front trim cover includes a rear edge having first and second sides, wherein the first zipper portion of the first side of the front trim cover is disposed on an inner surface of the front trim cover and inset from the first side of the rear edge of the front trim cover.

5. The trim cover of claim 4, wherein the first zipper portion of the second side of the front trim cover is disposed on the inner surface of the front trim cover inset from the second side of the rear edge.

6. The trim cover of claim 4, wherein the first and second sides of the front trim cover conceal respective zipper assemblies defined when the first zipper portions of the front trim cover are coupled to the second zipper portions of the first and second intermediate strips.

7. A trim cover for a seat assembly, comprising:
   a rigid back panel having first and second sides;
   an intermediate strip having first and second ends, the first end including a zipper portion, and the second end operably coupled to the second side of the rigid back panel;
   a front trim cover having a zipper portion releasably coupled to the zipper portion of the intermediate strip; and
   a zipper assembly defined by the zipper portion of the intermediate strip and the zipper portion of the front trim cover, wherein the zipper assembly is concealed by a portion of the front trim cover when the zipper portion of the intermediate strip is coupled to the zipper portion of the front trim cover.

8. The trim cover of claim 7, wherein the rigid back panel is a compression molded unitary back panel.

9. The trim cover of claim 8, wherein the second side of the rigid back panel is stitched to the second end of the intermediate strip.

10. The trim cover of claim 9, wherein the front trim cover is a soft front trim cover having a tear seam disposed thereon.

11. The trim cover of claim 8, wherein the compression molded back panel includes an inset central portion.

12. A seat assembly, comprising:
    a seatback frame assembly having first and second side members;
    a cushion assembly operably coupled to the seatback frame assembly;
    a front trim cover at least partially covering the cushion assembly and the frame assembly and having a zipper portion disposed on a first side thereof;
    an intermediate strip having first and second ends, the first end including a zipper portion releasably coupled to the zipper portion of the front trim cover; and
    a self-supporting back panel having an edge portion, wherein the edge portion is operably coupled to the second end of the intermediate strip, and further wherein the self-supporting back panel is a compression molded back panel, and further wherein the edge portion is a pierceable edge portion stitched to the second end of the intermediate strip.

13. The seat assembly of claim 12, including:
    an airbag coupled to the frame assembly.

14. The seat assembly of claim 13, wherein the front trim cover is a soft front trim cover having a tear seam disposed thereon, and further wherein the tear seam is disposed over the airbag in assembly.

15. The trim cover of claim 12, wherein the compression molded back panel includes an inset central portion.

* * * * *